Sept. 13, 1960 — E. L. PITTENGER — 2,952,090
DECOY ASSEMBLY
Filed Feb. 7, 1958 — 2 Sheets-Sheet 1
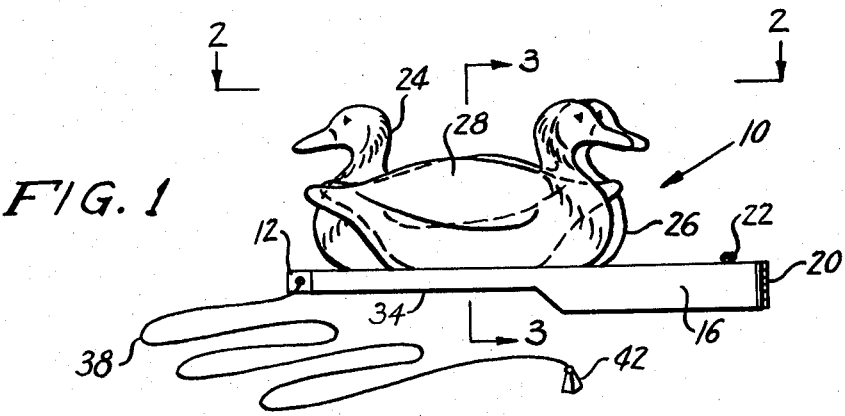
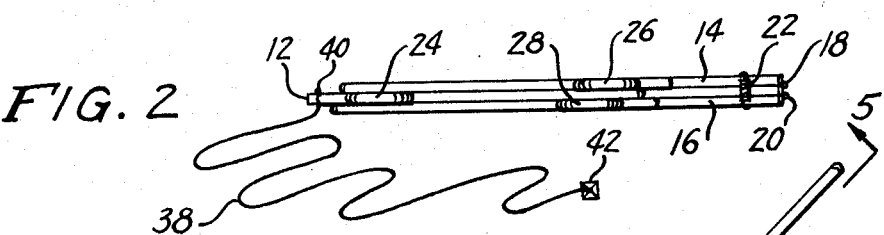
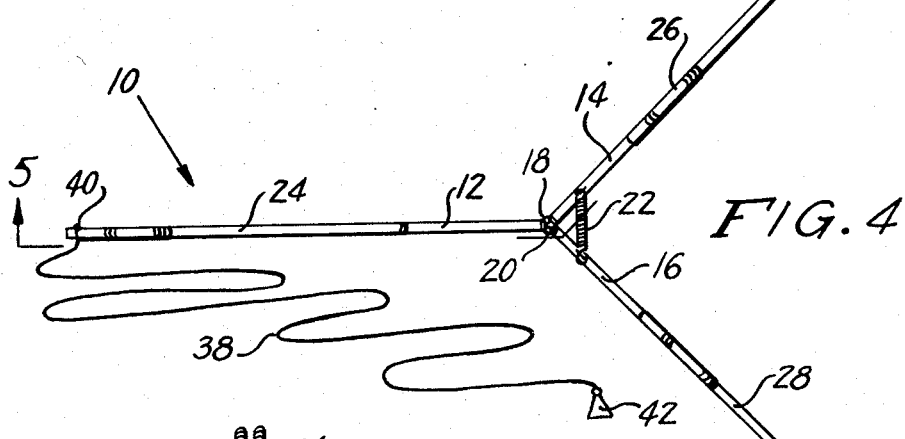
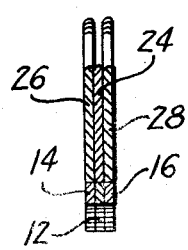
INVENTOR
EUGENE L. PITTENGER
BY Gustave Miller
ATTORNEY Sept. 13, 1960    E. L. PITTENGER    2,952,090
DECOY ASSEMBLY
Filed Feb. 7, 1958    2 Sheets-Sheet 2
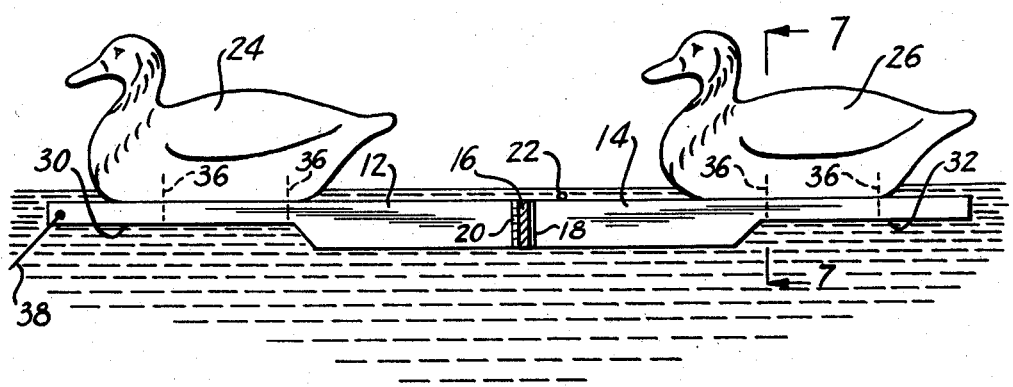
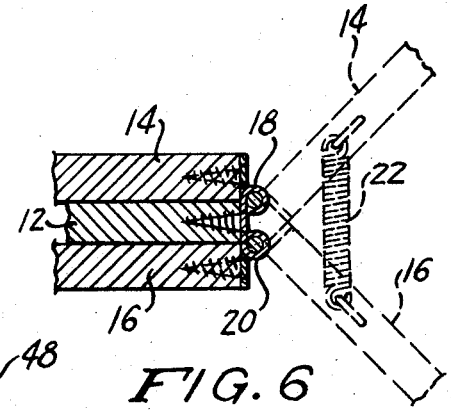
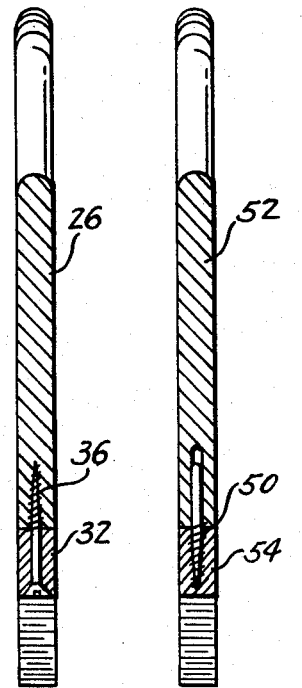
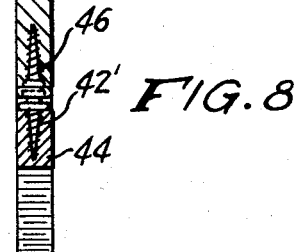
INVENTOR
EUGENE L. PITTENGER
BY
ATTORNEY United States Patent Office 2,952,090
Patented Sept. 13, 1960

2,952,090

DECOY ASSEMBLY

Eugene L. Pittenger, 152 Taylor Ave., Fort Snelling, St. Paul 11, Minn.

Filed Feb. 7, 1958, Ser. No. 713,859

1 Claim. (Cl. 43—3)

This invention relates to decoys, and it particularly relates to a decoy assembly consisting of a plurality of decoys so arranged as to be visible from all angles.

Although decoy assemblies of this general type have been known heretofore, such decoy assemblies were either too complicated and expensive to be commercially feasible or were not sufficiently adaptable to the environment of use on either water or land. In addition, they could only be used for one purpose so that if made for ducks they could not be readily used for doves, crows or other type of fowl.

It is, therefore, one object of the present invention to provide a decoy assembly which is especially buoyant on water as well as easily set up on land.

Another object of the present invention is to provide a decoy assembly which is simple in construction and easy to use.

Another object of the present invention is to provide a decoy assembly of the above type which is interchangeably adaptable for various types of decoy shapes.

Other objects of the present invention are to provide an improved decoy assembly, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 1 is a side elevational view of a decoy assembly embodying the present invention, the assembly being in closed and folded position.

Fig. 2 is a top plan view of the device on line 2—2 of Fig. 1.

Fig. 3 is a sectional view taken on line 3—3 of Fig. 1.

Fig. 4 is a top plan view of the device of Fig. 1 in open position.

Fig. 5 is a view taken on line 5—5 of Fig. 4.

Fig. 6 is an enlarged, sectional view of the hinge portion of the device, the parts being illustrated in full line in the closed position and in dotted outline in the open position.

Fig. 7 is a sectional view taken on line 7—7 of Fig. 5.

Fig. 8 is a view similar to Fig. 7 of a second embodiment of the present invention, involving snap fasteners.

Fig. 9 is a view similar to Figs. 7 and 8 of a third embodiment of the present invention, involving dowel pin fasteners.

Referring now in greater detail to the drawings wherein similar reference characters refer to similar parts, there is shown a decoy assembly generally designated 10 comprising three arms 12, 14 and 16 wherein the arms 14 and 16 are hinged at corresponding ends to one end of the arm 12 by means of a double hinge shown at 18 and 20. The arms 14 and 16 are resiliently urged into closed position against the arm 12 by means of a coil spring 22 connected between the arms 14 and 16. This spring 22 also acts to maintain the arms 14 and 16 in open position as shown in Fig. 4 since when the arms 14 and 16 are moved back into the obtuse angles shown in Fig. 4, the spring 22 acts to urge these arms outward to the open position of Fig. 4.

The arms 12, 14 and 16 are preferably constructed of a waterproof wood or wood coated with a light creosote-tar mixture so as to be best adapted for use in the water. Each of these arms 12, 14 and 16 forms a base to individually support a separate decoy form such as respectively shown at 24, 26 and 28. These decoy forms are illustrated as duck-shaped, however, any shape desired may be substituted.

The arms or bases 12, 14 and 16 are each undercut at their outer ends, as illustrated at 30, 32 and 34, these undercut portions underlying the respective decoy forms. These undercut portions provide the proper buoyancy at the center of the assembly, when opened, either in quiet or rough water. They also permit easy placement of the device in brush, trees or on the ground. Consequently, the device may be used either on the water for water-fowl or on the ground for upland game birds.

In addition to the above functions of the undercut portions 30, 32 and 34, they also serve to permit the easy interchange of decoy forms. This is accomplished by providing vertical screw-threaded holes in the arms above the undercut portions to receive screws 36. These screws are threaded into the bottom of the respective decoy form to releasably hold the decoy form in place. When it is desired to replace the decoy form with another, the screws 36 are merely removed, the replacement is made and the screws put back in place. The decoy forms are placed in such position that the forms 26 and 28 face in opposite directions to form 24 when in closed position and in the same general direction when in open position so that in open position, the decoys can be seen in similar fashion from any angle.

At that end of arm 12 which is remote from the hinge connection, there is provided a hole through which is passed a line or string 38. A stop 40 on the string maintains it fastened to the arm 12. At the free end of the string is a weight 42. This string and weight act as a kind of anchor to keep the decoy assembly facing in a general direction toward the wind.

It should be noted that the bases 12, 14 and 16 each extend forwardly beyond the respective decoy form. This adds to the buoyancy or bounce of the decoy. It is in this extended forward end of base 12 that the line or string 38 is attached.

In Fig. 8, there is shown a modification wherein instead of screw fastening means such as shown at 36, metal snap fasteners are used, the male snap 42' being illustrated as permanently secured to the base 44 while the female snap 46 is permanently secured to the decoy form 48. This permits a much easier interchangeability than even the screws 36 provide.

In Fig. 9, there is shown a third modification wherein dowel pin fasteners 50 are provided in the decoy forms 52 and the entire decoy form and dowel pins are attached or removed together from the base 54. This prevents accidental loss or misplacement of the fastening means.

Although this invention has been described in considerable detail, such description is intended as being illustrative rather than limiting, since the invention may be variously embodied, and the scope of the invention is to be determined as claimed.

Having thus set forth and described the nature of this invention, what is claimed is:

A decoy assembly comprised of a center arm and a pair of side arms each of said arms having a flat end, a three leaved hinged member, screws connecting one leaf of said hinge member to each flat end, a hinge barrel between each hinge leaf and its adjacent leaf, said hinge leaves being arranged to present a substantially flat surface when said arms are folded in parallel alignment, said hinge barrels serving, together with the abutment of said flat ends of said side members, as stops whereby when said arms are unfolded said side arms extend at an obtuse angle relative to each other and relative to said center arm, each of said arms being cut away on its under side for approximately one half its length on the half furthermost from the hinged end, a decoy form for each arm, cooperating means in each said cut away half of said arm and each said decoy form for removably attaching each said decoy form to its cut away half of said arm, said cut away portion of each being of a length substantially equal to the length of a decoy form to balance the assembly, the ends of said arms extending outwardly beyond the ends of said decoy forms, an eye attached to the top of each side arm between said decoy and said hinge member, and spaced from said hinge member, a coil spring extending between said eyes across said center arm when said arms are in folded position whereby when said side arms are folded said spring serves to hold said side arms against said center arm and when said side arms are extended said spring serves to bias said side arms toward each other against the stops formed by said hinge barrels and the abutment of said flat ends with each other to hold said side arms in extended obtusely angled position, said decoy forms heading in the same general direction when said arms are in extended position, an anchor and an anchor line secured to the projecting end of said center arm beyond the decoy form supported thereon to thereby anchor said decoys heading into the wind.

References Cited in the file of this patent
UNITED STATES PATENTS

| | | |
|---|---|---|
| 760,683 | Coudon | May 24, 1904 |
| 775,545 | Riggs | Nov. 22, 1904 |
| 796,147 | Reynolds | Aug. 1, 1905 |
| 1,641,215 | Winter | Sept. 6, 1927 |
| 1,979,843 | Roos | Nov. 6, 1934 |
| 2,522,295 | Olsen | Sept. 12, 1950 |